(12) United States Patent
Cotton (10) Patent No.: US 9,145,872 B2
(45) Date of Patent: Sep. 29, 2015

(54) ATMOSPHERIC WATER VAPOR ENGINE

(71) Applicant: John M. Cotton, Rochester, NY (US)

(72) Inventor: John M. Cotton, Rochester, NY (US)

( * ) Notice: Subject to any disclaimer, the term of this patent is extended or adjusted under 35 U.S.C. 154(b) by 0 days.

(21) Appl. No.: 14/195,621

(22) Filed: Mar. 3, 2014

(65) Prior Publication Data
US 2014/0311144 A1 Oct. 23, 2014

Related U.S. Application Data

(60) Provisional application No. 61/780,177, filed on Mar. 13, 2013.

(51) Int. Cl.
*F03G 6/06* (2006.01)
*F01K 21/04* (2006.01)

(52) U.S. Cl.
CPC .............. *F03G 6/065* (2013.01); *F01K 21/04* (2013.01); *Y02E 10/46* (2013.01)

(58) Field of Classification Search
CPC ............... F01D 13/00; F05D 2210/13; F05D 2210/132; F05D 2210/242
USPC .......................................... 415/169.2, 169.4
See application file for complete search history.

(56) References Cited

U.S. PATENT DOCUMENTS

| | | | | |
|---|---|---|---|---|
| 4,641,498 | A * | 2/1987 | Markovitch et al. | 60/641.2 |
| 7,086,823 | B2 * | 8/2006 | Michaud | 415/4.2 |
| 8,875,509 | B2 * | 11/2014 | Glezer et al. | 60/641.11 |
| 2007/0163095 | A1 | 7/2007 | McAllister et al. | |
| 2008/0243352 | A1 | 10/2008 | Healy | |

FOREIGN PATENT DOCUMENTS

| | | |
|---|---|---|
| EP | 2143907 A1 | 1/2010 |
| RU | 2007123156 A | 12/2008 |

OTHER PUBLICATIONS

International Search Report in related international application No. PCT/US2014/020836, mailed Jun. 19, 2014.
Written Opinion of the International Search Authority in related international application No. PCT/US2014/020836, mailed Jun. 19, 2014.

* cited by examiner

*Primary Examiner* — Edward Look
*Assistant Examiner* — Jason Davis
(74) *Attorney, Agent, or Firm* — Day Pitney LLP (57) ABSTRACT

An engine for harvesting energy stored in water vapor includes a vortex chamber coupled to an extraction unit and also to a vortex induction unit, the vortex induction unit configured to induce a vortex of water vapor in the chamber and the extraction unit configured to harvest energy from the flow of water provided by the chamber. A method of operation is provided. Additionally, and electrical generation system is disclosed.

15 Claims, 8 Drawing Sheets

ATMOSPHERIC WATER VAPOR ENGINE

CROSS-REFERENCE TO RELATED APPLICATION

The present patent application claims the benefit of priority to U.S. Provisional Patent Application Ser. No. 61/780,177, filed Mar. 13, 2013. The aforementioned patent application is incorporated by reference herein in its entirety for any purpose whatsoever.

BACKGROUND OF THE DISCLOSURE

1. Field of the Disclosure

The present disclosure relates generally to harvesting energy using a turbine driven by a renewable energy resource.

2. Brief Description of the Related Art

With the continuing growth in demand for energy as well as increases in its cost, there is a constant need for new energy supplies, and in particular for low cost and non-polluting alternatives. Many have recognized the value in harvesting energy from renewable resources. Aside from intrinsic variations, many forms of renewable energy are continually available and abundant. For example, it has long been recognized that solar and wind energy possess considerable energy. A variety of techniques have been developed to take advantage of these resources and they make substantial contributions to energy production today.

A variety of other renewable resources are available. Some of these are yet to be tapped, or the technology remains in its infancy. Consider the harvesting of energy that is stored in water vapor.

Water vapor in the atmosphere is primarily the result of the sun converting water on the surface of the Earth from the liquid phase to the gaseous phase. In this process, solar energy is absorbed by water molecules which are heated to the point of vaporization. Water vapor is also the result of many other sources of heat, both industrial and natural. Whatever the source is, any technique which is able to extract thermal energy transferred to water vapor will benefit from a virtually inexhaustible source of energy. This has not gone unnoticed, and some attempts have been made to provide viable solutions.

One solution for extracting energy stored in water vapor is that of a atmospheric vortex engine. Generally, a conventional atmospheric vortex engine makes use of a tornado-like convective vortex. The convective vortex may be accomplished with a device having a cylindrical wall in which air carrying water vapor is tangentially admitted to the base of the wall. The convective vortex is started by heating the air within the wall with fuel. The convective vortex is sustained using the naturally occurring heat of the ambient air or by a peripheral heat exchanger. Unfortunately, such conventional atmospheric vortex engines, have a cylindrical wall open on the upper end that acts as a chimney. This open end can allow the convective vortex to escape. Furthermore, turbines used in conventional atmospheric vortex engines are typically located at the input and low pressure side of the engine. This does not provide for harvesting energy which may be developed from humid air. Given the requirement to maintain a chimney of substantial height, such devices require substantial space and apparatus and are not easily deployed.

Some other devices that make use of a tornado-like convective vortex admit air to the base of a cylindrical wall via tangential ducts. Despite the atmospheric vortex engine having a cylindrical wall with an opening at the upper end, the heat required to sustain the vortex is provided by, for example, a peripheral heat exchanger.

There is a need for improved techniques to harvest the latent heat of vaporization of the water vapor in addition to, or as an alternative to the Chimney effect. Preferably, the technique should use the vortex to lower the temperature of the water vapor at the center of the vortex to the dew point, so that the water vapor condenses, and so releases it's latent heat of condensation which goes to augment the kinetic energy of the vortex. Once this is achieved, the chimney effect is no longer necessary, allowing the vortex chamber to be oriented horizontally.

SUMMARY OF THE DISCLOSURE

In one embodiment, an engine for harvesting energy stored in water vapor is provided. The engine includes a vortex chamber coupled to an extraction unit and also to a vortex induction unit, the vortex induction unit configured to induce a vortex of water vapor in the chamber and the extraction unit configured to harvest energy from the flow of water provided by the chamber.

In another embodiment, a method for harvesting energy stored in water vapor is provided. The method includes inducing a vortex of water vapor within a vortex chamber; permitting the induced vortex to mature such that water in the water vapor experiences a phase change into a liquid state; and extracting kinetic energy from at least one of the liquid water and air from the mature vortex.

In yet another embodiment, an electrical generator is provided. The electrical generator includes an engine for harvesting energy stored in water vapor, the engine including a vortex chamber coupled to a generator and also to a vortex induction unit, the vortex induction unit configured to induce a vortex of water vapor in the chamber and the generator configured to convert kinetic energy from the flow of water provided by the chamber into an electrical signal.

BRIEF DESCRIPTION OF THE DRAWINGS

Further features and advantages of the disclosure will become apparent from the following detailed description taken in conjunction with the accompanying drawings, in which:

FIG. 2, which includes

FIG. 3, which includes

FIG. 4, which includes

FIG. 5, which includes

FIG. 6, which includes

FIG. 7, which includes

FIG. 9, which includes

DETAILED DESCRIPTION OF THE DISCLOSURE

An atmospheric vapor engine (AVE) is disclosed herein. Generally, the atmospheric vapor engine provides for harvesting energy carried by atmospheric water vapor. Accordingly, the atmospheric vapor engine may be combined with other devices, such as a generator used to generate electricity.

Prior to discussing the atmospheric vapor engine (AVE) in detail, some context is provided.

As discussed herein, the term "renewable energy" generally refers to energy derived from resources which are naturally replenished over time. Exemplary types of renewable energy include solar, wind, geothermal, waves, and the like. Heat (thermal energy) released from water vapor as it is cooled is another source. The atmospheric vapor engine (AVE) takes advantage of the latent heat (or energy released) by water vapor during a phase transition from gas to liquid. This phase transition produces "sensible heat."

Generally, the term "water vapor" refers to the gaseous phase of water. In general, and as used herein, "water vapor" refers to air that is carrying some fraction of water in gaseous form. This may also be referred to as "moist air," as "humid air" and by other similar terms. As used herein, it is not required that water vapor have any particular fractional composition or ratio of water and air. Rather, a degree of humidity required is merely that which is deemed adequate by a user, designer, manufacturer or other similarly interested party.

Although discussed herein as a "atmospheric vapor engine," it is not required that water vapor originate in the atmosphere.

Also as discussed herein, the term "vortex" generally refers to a pattern of flow within a fluid. A vortex is a region within the fluid where flow is primarily of a spinning motion about an imaginary axis. It is an observable natural phenomenon that any vortex produces a lowering of pressure at its center. Examples of vortexes include whirlpools (where the medium is purely liquid), dust devils (whirlwinds of air into which dust and debris particles get trapped, making it visible, where the medium is purely air), and tornadoes and hurricanes (where the medium is a water vapor/air mixture). The energy which drives the whirlpool derives from the diversion of a liquid flow impinging on an obstacle. The energy which drives a dust devil derives from the pressure reduction at the center of the dust devil vortex producing a consequential temperature reduction releasing the specific heat from the air. The energy source which drives a hurricane or tornado derives from the central pressure reduction cooling the air/water mixture below the dew point, thereby releasing the specific heat of the mixture and the latent heat of vaporization of the water vapor.

Figure 1:
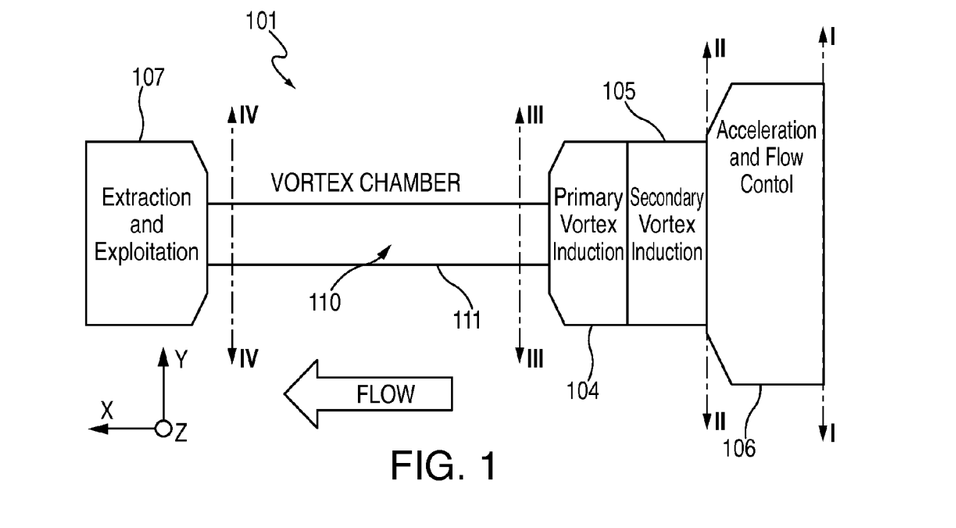
FIG. 1 is a schematic illustration providing an overview of an atmospheric water vapor engine as disclosed herein.

Generally, the atmospheric vapor engine includes a cylindrical vortex chamber located between an extraction and exploitation unit and a vortex induction unit. The vortex induction unit may be adjacent to an acceleration and flow control unit. A controlled vortex may be initiated by involving a jet of gas (air laden with water vapor) that is blown tangentially (and angled axially) by a fan into a cylindrical vortex chamber. A secondary method of maintaining the induced vortex in the cylindrical chamber may be used. Once induced, if there is adequate fuel in the form of water vapor, the vortex will be self-sustaining. With sufficient travel distance down the vortex chamber, the vortex will extract energy from the water vapor air mixture. This energy will manifest as the kinetic energy of the rotating air and water mixture in the outer portions of the vortex chamber furthest from the vortex induction region. Refer to FIG. 1 where an overview is provided.

Referring to FIG. 1, there is shown an exemplary and non-limiting embodiment of an atmospheric vapor engine (AVE) 101. The atmospheric vapor engine (AVE) 101 includes a primary vortex induction unit 104, a secondary vortex induction unit 105, and a vortex chamber 110 enclosed by a cylinder 111. The atmospheric vapor engine (AVE) 101 includes an acceleration and flow control unit 106 and an extraction unit 107. Flow within the atmospheric vapor engine (AVE) 101 generally begins in the acceleration and flow control unit 106, and extends through the AVE 101 into the extraction unit 107.

Note various conventions that have been adopted herein to facilitate discussion in relationship to the drawings. For example, note that in FIG. 1, Roman numerals are used to denote certain cross-sectional planes arbitrarily drawn through the atmospheric vapor engine (AVE) 101. More specifically, Roman numeral I is used to denote a cross-sectional plane at the beginning of the acceleration and flow control unit 106. Roman numeral II is used to denote a cross-sectional plane at a transition from the acceleration and flow control unit 106 to the secondary vortex induction unit 105. Roman numeral III is used to denote a cross-sectional plane at an early portion of the vortex chamber 110. Roman numeral IV is used to denote a cross-sectional plane at a later portion of the vortex chamber 110.

Additionally, axes of a coordinate system are provided throughout the drawings. Generally, it may be considered that the atmospheric vapor engine (AVE) 101 extends in an X-direction, and has a height that is measurable in a Y-direction. With reference to FIG. 1, a width of the atmospheric vapor engine (AVE) 101 is measurable in a Z-direction.

The cross-sectional planes and coordinate systems provided herein are merely for purposes of referencing and to aid in the discussion of the atmospheric vapor engine (AVE) 101. No limitations are implied or are to be inferred from these conventions.

Aspects of the atmospheric vapor engine (AVE) 101 are now presented in an order that is generally organized according start-up and operation of the engine 101.

Refer now to FIG. 4, where aspects of the primary vortex induction unit 104 are shown. FIG. 4*a* presents aspects of the primary vortex induction unit 104 in a cutaway side view, and FIG. 4*b* shows a cutaway transverse vertical cross-section at the plane indicated by reference number 405.

In the primary vortex induction unit 104, a jet of humid air 413 used to induce the vortex is produced by a fan assembly 404. Merely for simplicity, the fan assembly 404 is shown as a single block. The fan assembly 404 may include any type of fan apparatus deemed appropriate. For example, the fan assembly 404 may include a variable speed motor for providing variable speed control of the fan assembly 404. The fan assembly 404 provides the jet of humid air 413 to an upper manifold 403 and a lower manifold 402. In this example, the lower manifold 402 penetrates a wall of the cylinder 111. The jet of humid air is then guided into a vortex chamber 110. The portion of the vortex chamber 110 shown in FIG. 4*a* leads from a secondary vortex induction unit 105 through to the vortex chamber 110 (discussed further below).

Figure 4A:
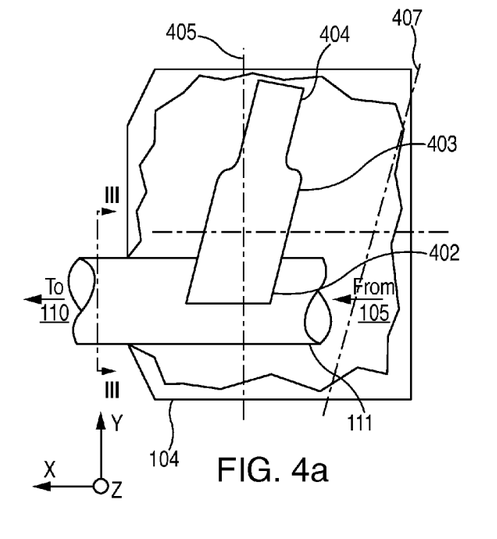
FIGS. 4a, 4b, 4c, 4d, 4e and 4f, are schematic drawings depicting aspects of the vortex induction unit shown in FIG. 1.
Figure 4B:
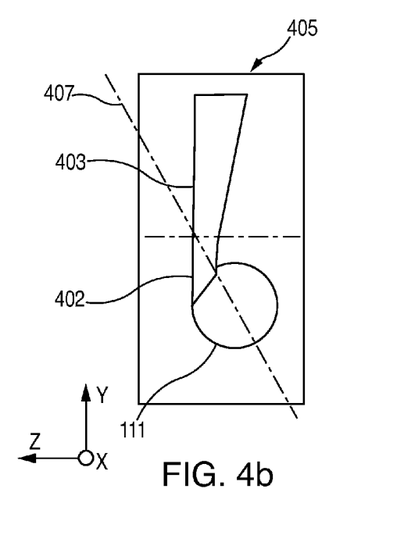
Figure 4C:
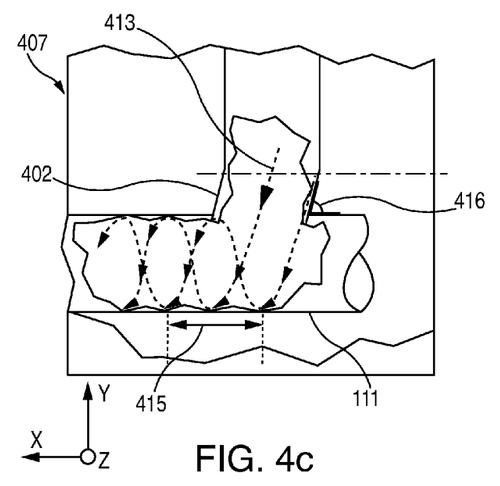
Figure 4D:
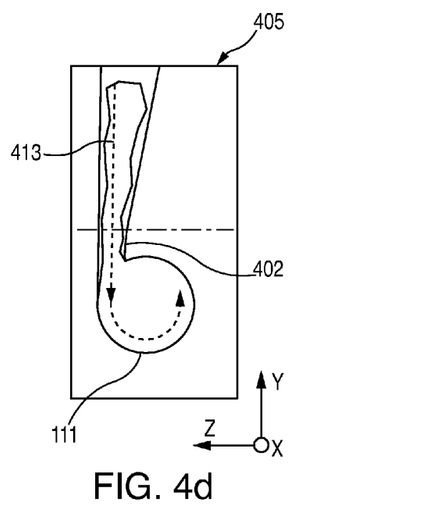

Refer now also to FIGS. 4*c* and 4*d*. FIG. 4*c* depicts flow characteristics within the portion of the primary vortex induction unit 104 depicted in FIG. 4*a*. Similarly, FIG. 4*d* depicts flow characteristics within the portion of the primary vortex induction unit 104 depicted in FIG. 4*b*. Accordingly, some aspects such as presentation of the lower manifold 402 are generally omitted to emphasize the flow characteristics.

It may be seen with reference to FIGS. 4*c* and 4*d*, that the lower manifold 402 introduces the jet of humid air 413 tangentially into the vortex chamber 110. A further sectional plane (denoted with reference number 407), indicated in the transverse vertical section (denoted with reference number 405), is used to show the gas flow in FIGS. 4*c* and 4*d*.

In some embodiments, the manifold (for example, the upper manifold 403) has a cross-section that is designed to accelerate the air/water vapor mixture towards the vortex chamber 110. In this example, the upper manifold 403 gradually narrows into the lower manifold 402. The lower manifold 402 is generally angled tangentially to the vortex chamber 110, and is also angled relative to the longitudinal axis of the wall of the cylinder 111. FIG. 4*c* depicts the angular relationship of the lower manifold 402 with the wall of the cylinder 111 as manifold angle 416. Manifold angle 416 may be selected such that the gas flow forms a helix 415 of a predetermined pitch. The pitch of the helix 415 is generally equivalent to the longitudinal (or axial) dimension of the lower manifold 402.

Accordingly, by injecting the jet of humid air 413 into the cylindrical volume bounded by the wall of the cylinder 111, a vortex of water vapor is initiated.

Once the vortex has been fully initiated, it will become self-sustaining by the low pressure at the vortex center (that is, along a central axis of the cylinder 111 bounded within the wall of the cylinder 111). The low pressure at the vortex center will draw in humid air through the mechanism of the secondary vortex induction unit 105 (shown in FIG. 5 and FIG. 9*a*). In order to increase efficiency of flow of the humid air, an aperture of the lower manifold 402 may be closed. Closing of the aperture of the lower manifold 402 may be accomplished with a door 408 (shown in FIG. 4*f* and FIG. 8), which may be designed to cover the aperture and provide a seal that is generally consistent with the appearance of the internal surface of the wall of the cylinder 111. The door 408 may be attached by a hinge 409 and biased by a spring in the hinge 409 (not shown). Biasing the hinge 409 with a spring provides a system such that shutting down flow of the jet of humid air 413 from the fan assembly 404 will cause the door 408 to close.

Figure 4E:
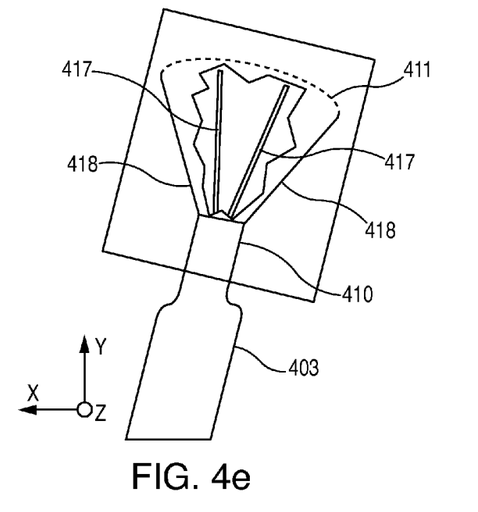

FIG. 4*e* shows an expanded view of aspects of the fan assembly 404. In some embodiments, the fan assembly 404 includes a variable speed fan 410. The variable speed fan 410 is fed with humid air drawn through a fine filter 411, and guided by an air acceleration assembly 418. The air acceleration assembly 418 contains smoothing vanes 417. This arrangement provides for flow of the humid air through the fine filter 411 to travel at a much lower speed than air flowing through the jet of humid air 413.

The use of the variable speed fan 410 permits the user to adjust speed of the jet of humid air 413 in order to achieve a lowering of the gas temperature to below the dew point at the center of the vortex chamber 110. Generally, temperature reductions needed are dependent on the ambient temperature and relative humidity of the humid air that is input through the fine filter 411.

Figure 5A:
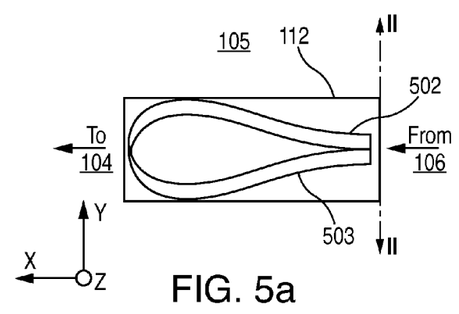
FIGS. 5a and 5b, are schematic drawings depicting aspects of the secondary vortex induction unit shown in FIG. 1.
Figure 5B:
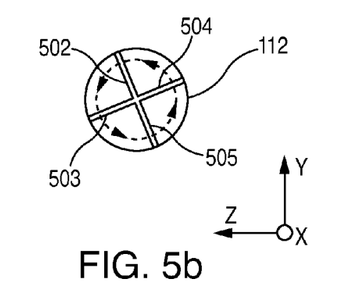

An embodiment of the secondary vortex induction unit 105 is shown in FIG. 5. In this example, the secondary vortex induction unit 105 includes four guidance vanes 502, 503, 504 and 505. The four guidance vanes 502, 503, 504 and 505 are disposed in a feeder cylinder 112 with a diameter that is substantially equivalent to the diameter of the vortex chamber 110. Generally starting at the second cross-sectional plane (II), the four guidance vanes 502, 503, 504 and 505 extend radially outward from a central axis. Progressing in the X-direction of the atmospheric vapor engine (AVE) 101, each one of the four guidance vanes 502, 503, 504 and 505 exhibit a gradual twist. The twist provided in the four guidance vanes 502, 503, 504 and 505 is generally in agreement with the pitch of the helix 415. In some embodiments, at least one cycle of the helix 415 is provided in the four guidance vanes 502, 503, 504 and 505 prior to the secondary vortex induction unit 105 joining with the primary vortex induction unit 104. This ensures that the humid air drawn in from the acceleration and flow control unit 106 joins the existing vortex with no disruption.

Figure 6A:
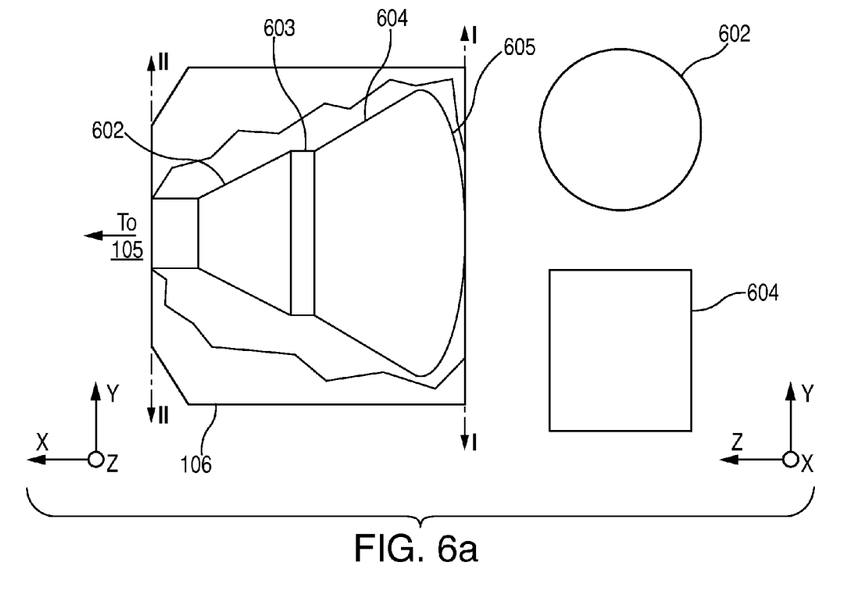
FIGS. 6a, 6b and 6c, are schematic drawings depicting aspects of an acceleration and flow control unit shown in FIG. 1.
Figure 6B:
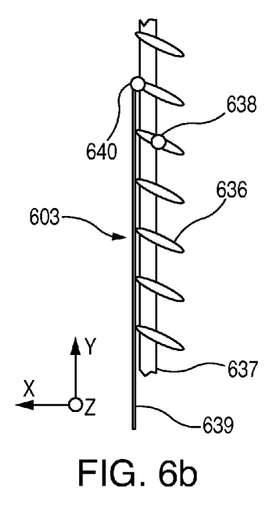
Figure 6C:
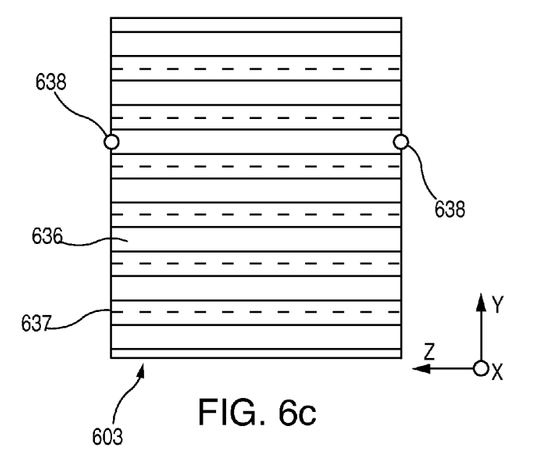

Refer now to FIG. 6, where aspects of the acceleration and flow control unit 106 are shown. Among other things, the acceleration and flow control unit 106 provides for feed control of the atmospheric vapor engine (AVE) 101.

The acceleration and flow control unit 106 may include a filter 605 (see FIG. 6*a*). The filter 605 may be included to filter incoming humid air from contaminants. Accordingly, the filter 605 may be configured to balance production with hazard limitation. Specifically, the filter 605 may be configured to remove, or substantially remove particular contaminants that may induce erosion and/or corrosion particularly to turbine components. Additionally, the filter 605 may be configured to limit pressure differential from a feed supply of water vapor (not shown) and the water vapor that is introduced into the atmospheric vapor engine (AVE) 101.

In some embodiments, the atmospheric vapor engine (AVE) 101 is configured to accelerate flow between the filter 605 and a secondary vortex induction unit 105. For example, in some embodiments, the area of the filter 605 at cross-sectional plane (I) is about forty (40) times the area of the filter 605 at cross-sectional plane (II).

Generally, the filter 605 may include any type of material deemed appropriate. For example, the filter 605 may include a non-woven fabric of a desired thickness and porosity. The filter 605 may be configured for maintenance and/or exchange during operation of the atmospheric vapor engine (AVE) 101.

In this embodiment, a first acceleration housing 604 and a second acceleration housing 602 are included within the acceleration and flow control unit 106. In this example, the cross-section of the first acceleration housing 604 is generally rectangular. The cross-section of the second acceleration housing 602 generally blends from rectangular to circular. Disposed between the first acceleration housing 604 and the second acceleration housing 602 is a partitioning unit 603.

Generally, the partitioning unit 603 provides for shutdown and flow control management. Refer now also to FIGS. 6*b* and 6*c*, where aspects of one embodiment for shutdown and flow control are depicted. FIG. 6*b* provides a cutaway side view of the partitioning unit 603, while FIG. 6*c* provides a cutaway end view of the partitioning unit 603.

In this embodiment, the partitioning unit 603 includes a plurality of vanes 636. Generally, each one of the vanes 636 includes a thin flat, or substantially flat, surface that is rotatable about a longitudinal axis (that is, an axis in the Z-direction). In the example depicted, each vane in the plurality of vanes 636 includes a thin, oval profile.

Each one of the vanes 636 is mounted to a frame 637 that is generally sized to fit within an inner perimeter of the acceleration and flow control unit 106 (that is, within an inner perimeter of the first acceleration housing 604 and/or the second acceleration housing 602). Each one of the vanes 636 is mounted to the frame 637 by a shutter pivot 638 disposed at each end thereof.

Collectively, the plurality of vanes 636 operate as a shutter assembly. That is, the plurality of vanes 636 provide for placing the partitioning unit 603 in an "open" position (where water vapor is introduced into the atmospheric vapor engine (AVE) 101), or placing the partitioning unit 603 in a "closed" position (where water vapor is blocked from entry into the atmospheric vapor engine (AVE) 101). The partitioning unit 603 shown in FIGS. 6b and 6c is depicted in the open position.

In the embodiment shown, each one of the shutter pivots 638 includes a bearing. In some embodiments, at least some of the shutter pivots 638 include less elaborate devices, such as mated screw eyes. In further embodiments, at least some of the shutter pivots 638 simply include a biased form of elastic material. In some embodiments, at least some of the shutter pivots 638 include a bias device to bias the partitioning unit 603 into an open position. Regardless of construction, each one of the shutter pivots 638 provides for pivoting or rotation of each one of the vanes 636 between an open position and a closed position.

Also shown in FIGS. 6b and 6c is a control rod 639. In this embodiment, the control rod 639 is coupled to an edge of each one of the vanes within the plurality of vanes 636. More specifically, the control rod 639 is coupled to an edge at a control pivot 640. Each control pivot 640 is distally oriented from the axis of rotation for each one of the vanes within the plurality of vanes 636. Accordingly, upward or downward movement of the control rod 639 provides for rotation of the plurality of vanes 636, and therefore opening or closing of the partitioning unit 603.

Each control pivot 640 may include any type of coupling deemed suitable. For example, each control pivot 640 may include a bearing, a mechanical linkage, fabric, elastic material, a magnetic linkage and other type of coupling or combination thereof. Each one of the shutter pivots 638 and the control pivots 640 may include any type of coupling or linkage deemed appropriate by a user, designer, manufacturer or other similarly interested party.

In some embodiments, the shutter pivots 638 include a plurality of respective motor controls. Accordingly, control may be achieved electronically by commanding each one of the motors (collectively or separately). Accordingly, the control rod 639 may be included as a backup manual control, or dispensed with altogether. In some embodiments, the control rod 639 is driven by a motor control.

Accordingly, the partitioning unit 603 may be used to adjust feedstock (that is, a supply of water vapor) to the atmospheric vapor engine (AVE) 101. By adjusting the partitioning unit 603 to a partially open or partially closed position, and operator may modulate intensity of a vortex within the atmospheric vapor engine (AVE) 101.

Figure 2A:
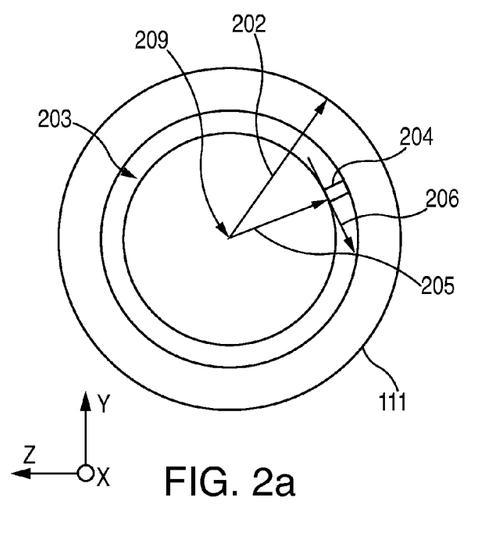
FIGS. 2a, 2b and 2c, are schematic drawings depicting aspects of an early stage of the vortex chamber shown in FIG. 1.
Figure 2B:
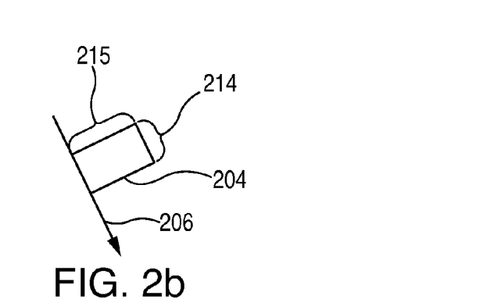
Figure 2C:
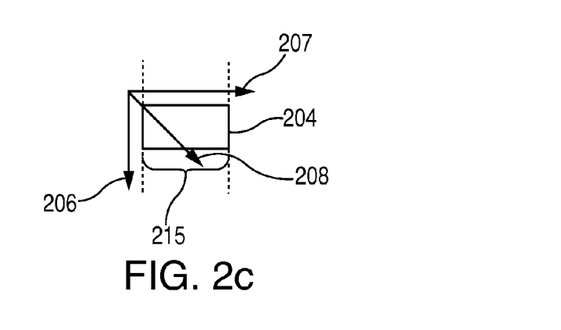
Figure 3A:
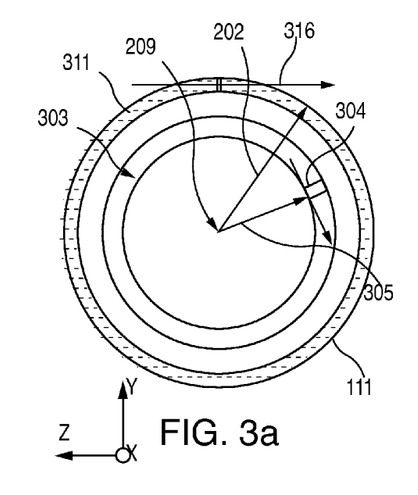
FIGS. 3a, 3b, 3c and 3d, are schematic drawings depicting aspects of a later stage of the vortex chamber shown in FIG. 1.
Figures 3B, 3C:
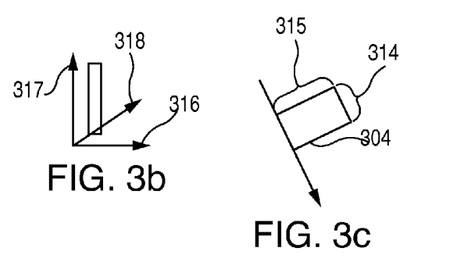
Figure 3D:
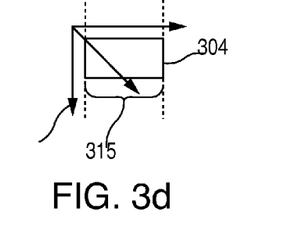

Refer now also to FIGS. 2 and 3, where aspects of the vortex chamber 110 are shown. Generally, the vortex chamber 110 is a cylindrical element. The vortex chamber 110 is in operational communication with the primary vortex induction unit 104 and the extraction unit 107. Humid air is introduced into the vortex chamber 110 by the primary vortex induction unit 104, and approximately at cross-sectional plane (III). Aspects of the vortex chamber 110 at cross-sectional plane (III) are discussed with reference to FIG. 2. A mature vortex is realized in the vortex chamber 110, approximately at cross-sectional plane (IV). Aspects of the vortex chamber 110 at cross-sectional plane (IV) are discussed with reference to FIG. 3.

The wall of the cylinder 111 of vortex chamber 110 has a radius 202. Generally, the inner surface of the cylinder 111 is of a smooth and continuous surface that is conducive to unperturbed containment and flow of the vortex. In order to describe operation of the vortex chamber 110, the vortex is described in terms of an "arbitrary small element" as well as an "arbitrary circular annulus." These arbitrary elements are introduced to better describe the fluid dynamics associated with the vortex in the vortex chamber 110.

Once a vortex has been initiated, the vortex chamber 110 contains an arbitrary circular annulus 203 which has an inner radius 205 from the chamber center 209. Generally, the arbitrary circular annulus 203 is representative of the vortex. Within the arbitrary circular annulus 203 is an arbitrary small element 204. The arbitrary small element 204 may be characterized by a radial height or thickness 215 and a circumferential width or thickness 214 (as shown in FIG. 2b).

FIG. 2c shows the arbitrary small element 204 having a velocity 208, which may be resolved into a tangential velocity 206, and a radial velocity 207. The relationship between temperature and pressure within this element is given by the Ideal Gas Law, Eq. (1):

$$Pv = NRT \qquad (1).$$

In Eq. (1), P represents pressure, v represents the volume of the arbitrary small element 204, T represents temperature, R is Boltzmann's constant ($1.3806488 \times 10^{-23}$ m² kg s⁻² K⁻¹) and N represents the number of water vapor and air molecules in the arbitrary small element 204.

As a consequence of the laws of nature described by the Ideal Gas Law (Eq. (1)), there is a pressure and temperature gradient, having a minimum at the center, and maximum at the wall of the cylinder 111. Thus, low pressure in the center of the vortex counteracts the centripetal force which causes radial velocity 207. Accordingly, the tangential velocity 206 of the arbitrary small element 204 is a gradient having a minimum on a side of the arbitrary small element 204 toward the center and a maximum on a side of the element facing the wall of the cylinder 111.

In a similar way, FIGS. 3a to 3d display the elements at the cross-sectional plane (IV). Analogous to arbitrary small element 204, element 304 is an arbitrarily small piece of an arbitrarily sized annulus 303. Arbitrarily sized annulus 303 is described by inner radius 305. Element 304 has a radial height or thickness 315 and a circumferential width or thickness 314. In addition, there is displayed an annulus of rotating liquid water 311 generally disposed on the inside surface of the wall of the cylinder 111 of the vortex chamber 110 and having a velocity 318. Velocity 318 may be resolved into a tangential velocity 316 a potential radial velocity 317. The wall of the cylinder 111 provides a reactionary pressure to counteract the potential radial velocity 317.

If the vortex has matured within the length of the vortex chamber 110, such that latter section of the vortex chamber contains almost completely separated air and water, then the rotating liquid water 311 will contain almost all the water from the water vapor/air mixture. This water will also contain a significant portion of the released kinetic energy.

The atmospheric vapor engine (AVE) 101 makes use of this released kinetic energy to drive the extraction unit 107.

Figure 7A:
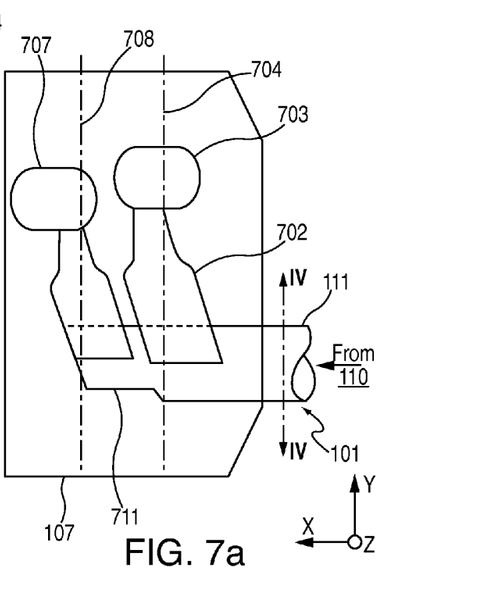
FIGS. 7a, 7b and 7c, are schematic drawings depicting aspects of an extraction unit shown in FIG. 1.
Figures 7B, 7C:
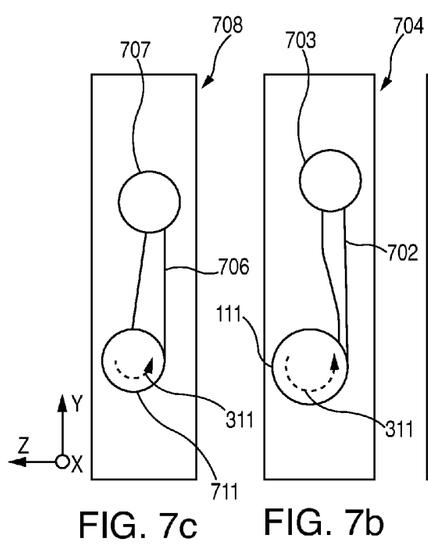

One embodiment of the extraction unit 107 is depicted in FIG. 7a. As noted above, once the vortex has matured, then the annulus of rotating liquid water 311 will contain rotating water with a high flow. In this embodiment, the flow is bled off through a tangential bleed off manifold 702, with a transverse section (denoted at reference number 704, see also FIG. 7b)

showing the shape of tangential bleed off manifold 702, and its connection to a high speed water turbine 703.

The remaining rotating air, with some water mixed in, continues to rotate for one further pitch of the helix 415. The air is directed into in a reduced diameter pipe 711, and is bled off through a second tangential manifold 706, shown in another transverse section denoted at reference number 708, see also FIG. 7c), to drive a second turbine 707.

Figure 4F:
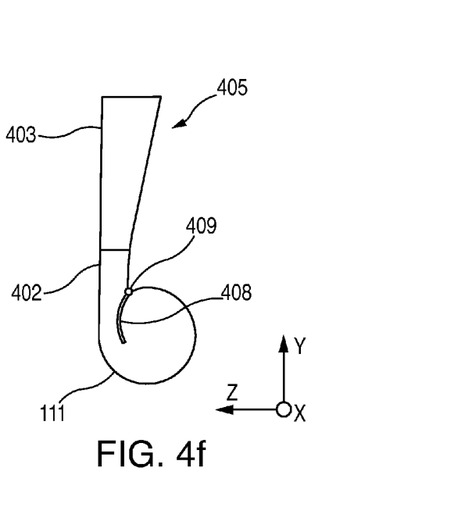
Figure 8:
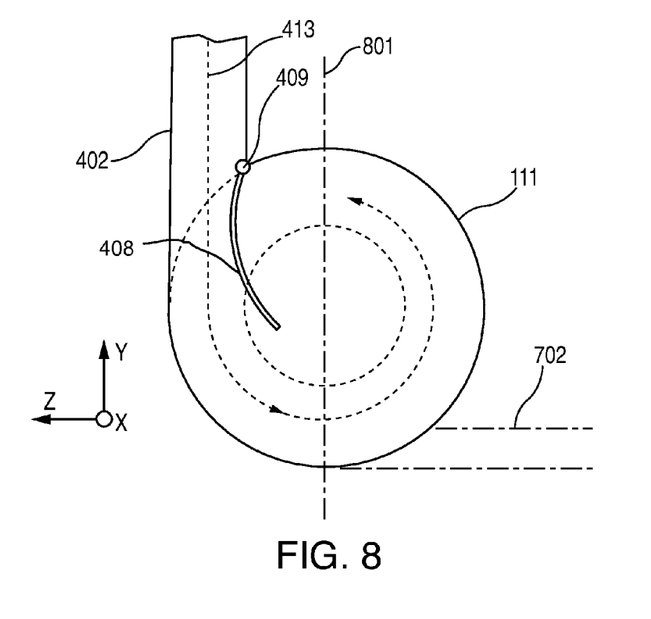
FIG. 8 is a schematic diagram depicting further aspects of the vortex induction unit introduced in FIG. 4.

FIG. 8 is an expanded version of FIGS. 4d and 4f, which shows the angular relationship of the lower manifold 402 to tangential bleed off manifold 702 (or 902, for an alternate embodiment) which resides further down the vortex chamber 110. Also depicted are door 408 and hinge 409 which closes off the lower manifold 402 when the vortex inducing inlet stream is terminated. FIG. 8 also identifies the vertical location as of the longitudinal section 801 of the vortex chamber 110.

Figure 9A:
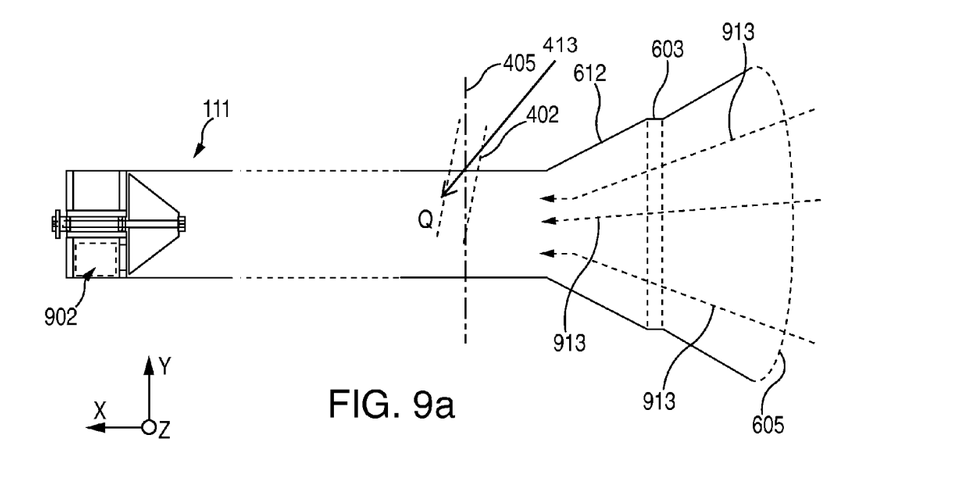
FIGS. 9*a*, 9*b* and 9*c*, are schematic drawings depicting aspects of another embodiment of an extraction unit shown in FIG. 1; and, FIG. 10 is a schematic diagram depicting an example of platter design for the extraction unit of FIG. 9.

An alternative embodiment of the extraction unit 107 is depicted in FIG. 9. FIG. 9a includes a Tesla type of turbine as an alternative means for extracting the energy from the rotating air/water mixture.

FIG. 9a depicts the location of the transverse vertical section (denoted as cross-sectional plane 405, also shown in FIG. 4a), and locates the first complete virtual "thread" of the helix 415 containing air and water vapor, which causes the pressure reduction at reference location Q. For clarity only one turn of the helix 415 is shown, and ultimately a pattern of the helix 415 will spread out as the main stream of humid air 913 enters.

The pressure reduction at reference location Q has two roles; first, to cause additional humid air 913 to be drawn in to the vortex chamber 110 through filter 605, partitioning unit 603, and inlet pipe 612, and second, to cause the temperature to drop to the dew point, to initiate the energy extraction from the water vapor. The additional flow of humid air 913 provides humidity fuel to feed and amplify the vortex in vortex chamber 110. Once the vortex center is adequately established to lower the temperature to the dew point, water vapor will start to condense, releasing latent heat of condensation to amplify the rotational energy of the vortex. This condensation is not anticipated to be an instantaneous event, but will take place progressively as the vortex travels down the chamber. The vortex will progressively mature as it moves down the chamber, until it reaches the platters of a Tesla turbine, whose location is shown at the end of the vortex chamber 110, and whose details are shown in FIGS. 9b and 9c.

Figure 9B:
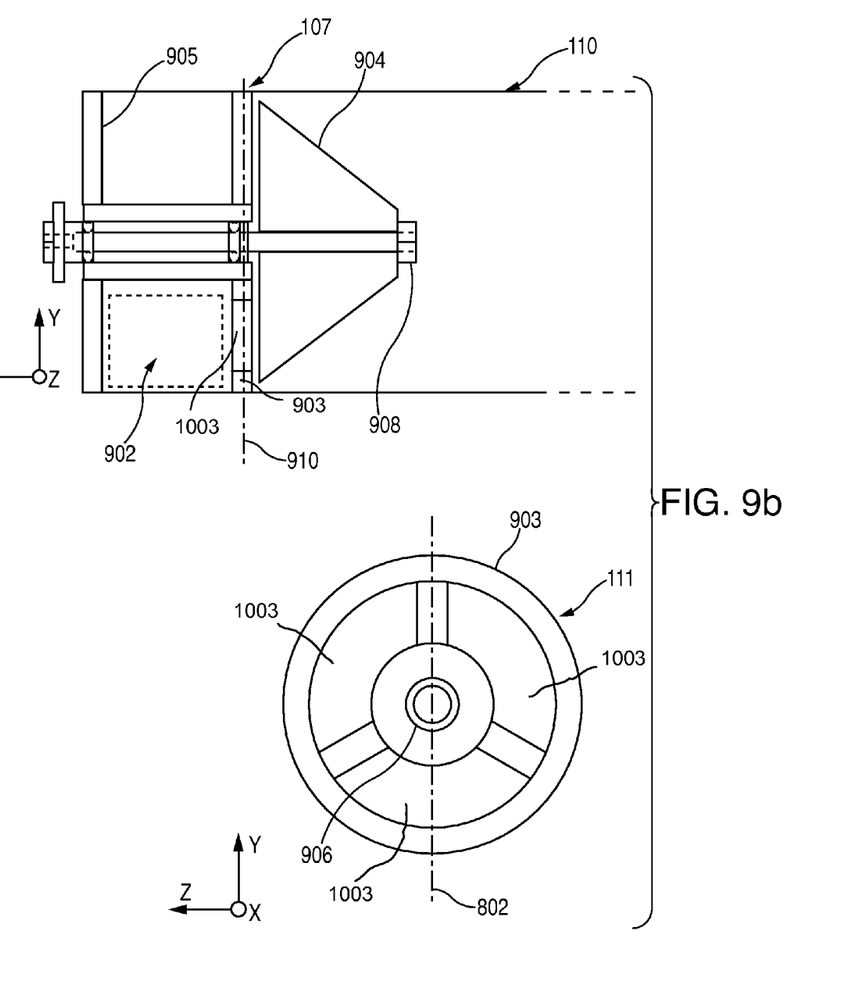
Figure 9C:
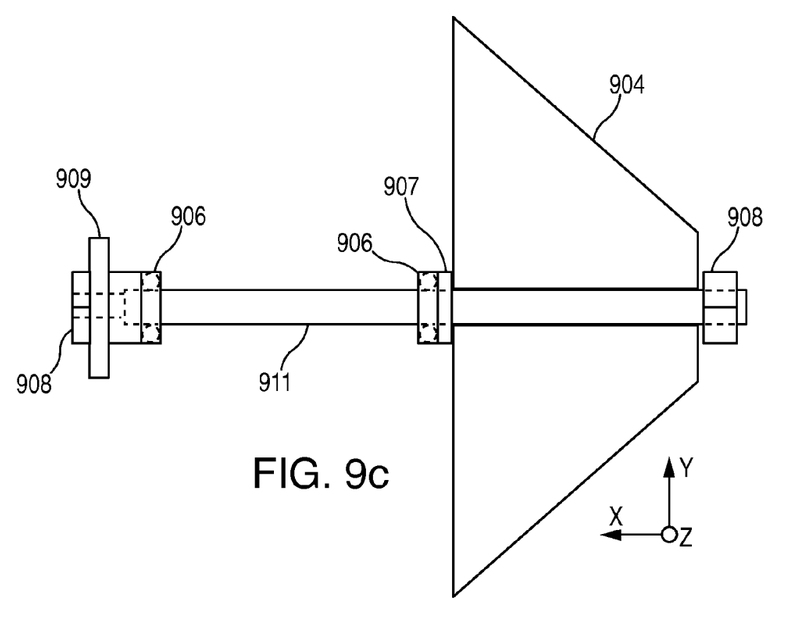
Figure 10:
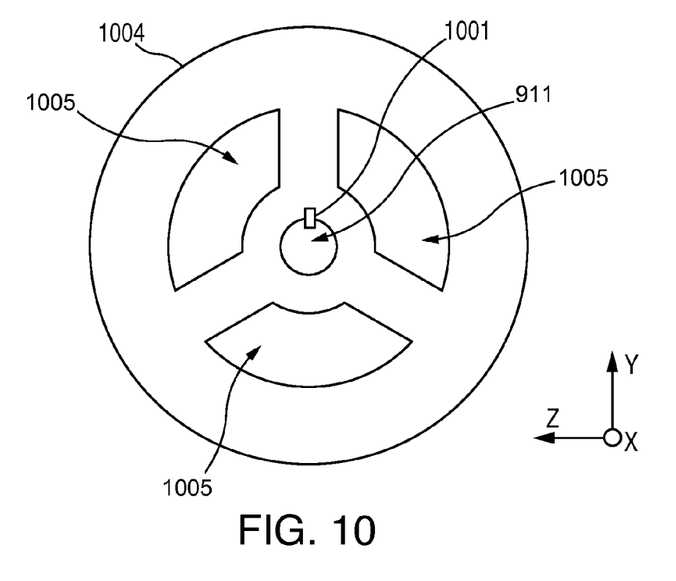

FIGS. 9b and 9c provide details of aspects of an extraction unit 107 making use of the Tesla turbine. The main housing may be a casting 903, which for example may be aluminum, and which fits inside the end of the vortex chamber 110, and supports a drive shaft 911 on cantilever bearings 906, and is in turn supported by an end plate 905. Platters 904 for the turbine are shown as a block, but are a series of hard discs are included. In one example, the platters 904 are of the order of ³⁄₃₂ inch thick, keyed to the shaft 911, separated by ³⁄₃₂ inch washers, and held in place by a retaining nut 908, and a flange 907, which is integral to the drive shaft 911. The platters 904 may be pierced by holes near the drive shaft 911, and thus allow the spent air and water to escape through the three slots 1003 in the casting 903 (as shown in FIG. 10) to the outlet pipe 902. The location of the casting 903 is shown in the upper portion of FIG. 9b, with section 910 through the casting, and the form of the casting 903 is shown in the lower portion showing slots 1003. Section 802 shows the plane of the upper portion of FIG. 9b. As shown in FIG. 10, an exemplary design of 904 platter 904 is shown. The platter 904 can be plastic 1004 or of other suitable material. In one embodiment, the platters 904 are round and contains three vents 1005 for water and air to pass through. The center of each platter 904 is a shaft 1002 and includes a keyway 1001.

The cantilever bearings 906 are representative of both needle roller support bearings and ball thrust bearings, mounted in the housing. A coupling drive for the electrical generator 909, together with thrust bearings and flange 907 prevent axial movement of the drive shaft 911, and is held in place on the drive shaft 911 with another retaining nut 908.

The usual casing for a Tesla turbine is close to the edge of the turbine platters 904. This is to constrain the impinging water or gas to flow through the spaces between the platters 904. However, for this system, as shown in FIG. 9a, the vortex, in which the rotating gas/water mixture is constrained by the vortex centripetal forces, and the progressive helical motion caused both by the angle of the jet of humid air 413, and the in-flowing humid air 913 constrain the rotating air and water to flow through the platters 904.

The shape of the outline of the set of platters 904 may be conical in order to capture the energy from all levels of the vortex, with dry air contributing near the center, to water droplets and coalesced water near the outer boundary. The secondary induction inflowing of humid air 913, is propelled by the pressure gradient from atmospheric pressure down to the pressure at reference location Q, associated with the initial dew point. The energy released in the vortex is a function of the humidity, which determines the latent heat energy available per unit volume; the atmospheric temperature; and total flow of humid air. These factors govern temperature drop to the dew point, and thus the specific heat energy released.

Many electrical generators require a constant speed of rotation, and thus a constant level of energy release. The one variable of those outlined above which is potentially controllable is the flow of humid air 913. This can be done, for example, with an electronic feedback control of the degree of opening of the partitioning unit 603, and by using a tachometer to measure the speed of rotation of the turbine shaft. Such a tachometer may be easily provided by a small magnet inserted onto the flange 907 of the drive shaft, 911, and a pick off coil mounted on the shaft housing.

Accordingly, the atmospheric vapor engine (AVE) 101 may be accompanied with other components not shown here in. For example, the AVE 101 may include electronic control systems. Examples of components for electronic control systems include at least one processor, memory, data storage, a communications interface, a user interface, electromechanical devices, optical devices, and other similar components. By way of example, electromechanical devices may be useful for receiving control signals from a control system and controlling aspects such as the partitioning unit 603. Optical devices may be useful for monitoring density, speed, flow and other similar parameters in the vortex chamber 110.

A control system may include a set of machine executable instructions stored on machine readable media, the instructions provided for execution of at least one method. Such instructions may be commonly referred to as "software." For example, software may be included to manage a feedback loop between the partitioning unit 603 and the speed of the turbine.

The atmospheric vapor engine (AVE) 101 may be configured for stand-alone operation, for operation in conjunction with energy storage (such as to supply battery storage), and may be configured for connection to a distribution system (for example, for connection to "the grid"). Accordingly, the atmospheric vapor engine (AVE) 101 maybe further outfitted with equipment and components necessary to support the given mode of operation. For example, a switching topology may be provided with the atmospheric vapor engine (AVE) 101 such that connections to the grid may be made in a fashion that complies with the standards of the grid operator. In some embodiments, the atmospheric vapor engine (AVE) 101 is configured to provide mechanical energy. That is, the atmospheric vapor engine (AVE) 101 does not provide electrical generation, but instead may provide for mechanically driving other apparatus. Exemplary apparatus include a mechanical pump, such as one used to draw water from a well.

The atmospheric vapor engine (AVE) 101 may be fabricated from any types of materials and/or components deemed appropriate. No limitations are implied or to be inferred regarding scale and/or construction of the atmospheric vapor engine (AVE) 101.

Having introduced aspects of the atmospheric vapor engine (AVE) 101, it should be understood that many variations may be realized. For example, the embodiment presented herein generally describes a linear flow. In the discussion, the AVE 101 is shown as disposed on a horizontal surface. No aspect of the foregoing is meant to imply any particular geometric requirements, orientation or other such limitations. In short, the teachings herein may be applied in any manner deemed appropriate by a user, designer, manufacturer or other similarly interested party.

In some embodiments, the atmospheric vapor engine (AVE) 101 is used for vapor recovery. That is, in some embodiments, the atmospheric vapor engine (AVE) 101 is used as part of an effluent control system. In these embodiments, humid effluent is directed into the atmospheric vapor engine (AVE) 101.

Various other components may be included and called upon for providing for aspects of the teachings herein. For example, additional materials, combinations of materials and/or omission of materials may be used to provide for added embodiments that are within the scope of the teachings herein. In the present application a variety of variables are described, including but not limited to components and conditions. It is to be understood that any combination of any of these variables can define an embodiment of the disclosure. Other combinations of articles, components, conditions, and/or methods can also be specifically selected from among variables listed herein to define other embodiments, as would be apparent to those of ordinary skill in the art.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. An engine for harvesting energy stored in water vapor, the engine comprising:

a vortex chamber coupled to an extraction unit and also to a vortex induction unit, the vortex induction unit configured to induce a vortex of water vapor in the chamber and the extraction unit configured to harvest energy from the flow of water vapor provided by the chamber;

wherein the vortex chamber is configured so as to permit the induced vortex to mature such that water in the water vapor experiences a phase change into a liquid state before reaching the extraction unit.

2. The engine as in claim 1, wherein the extraction unit is disposed at one end of the chamber and the induction unit is disposed at the other end of the chamber.

3. The engine as in claim 1, wherein the chamber comprises a cylinder.

4. The engine as in claim 1, wherein the vortex induction unit is configured to introduce a jet of humid air both tangentially and angled axially to an inner surface of the chamber.

5. The engine as in claim 4, wherein the configuration causes a helix of the jet of humid air within the chamber.

6. The engine as in claim 4, wherein the vortex induction unit comprises a variable speed fan for introducing the jet of humid air.

7. The engine as in claim 1, further comprising an acceleration and flow control unit configured to provide humid air to the vortex induction unit.

8. The engine as in claim 7, wherein the acceleration and flow control unit comprises a partitioning unit.

9. The engine as in claim 8, wherein the partitioning unit is operable to adjust the flow of humid air.

10. The engine as in claim 1, wherein the vortex induction unit comprises a seal configured to shut down flow to the vortex chamber.

11. The engine as in claim 1, wherein the extraction unit is configured to drive an electrical generator or provide mechanical energy to another apparatus.

12. The engine as in claim 1, wherein the extraction unit comprises at least one of a water driven turbine and an air driven turbine.

13. A method for harvesting water and energy stored in water vapor, the method comprising:

inducing a vortex of water vapor within a vortex chamber;

permitting the induced vortex to mature such that water in the water vapor experiences a phase change into a liquid state; and extracting water and kinetic energy from at least one of the liquid water, air and uncondensed water vapor flows from the mature vortex.

14. The method as in claim 13, wherein extracting kinetic energy comprises driving at least one of an electrical generator and a mechanical component.

15. An electrical generator comprising:

an engine for converting energy stored in water vapor, the engine comprising a vortex chamber coupled to a generator, an extraction unit, and also to a vortex induction unit, the vortex induction unit configured to induce a vortex of water vapor in the chamber and the generator configured to convert kinetic energy from an accelerated flow of condensed water, air and uncondensed water vapor provided by the chamber into an electrical signal;

wherein the vortex chamber is configured so as to permit the induced vortex to mature such that water in the water vapor experiences a phase change into a liquid state before reaching the extraction unit.

* * * * *